United States Patent [19]

Sugino

[11] Patent Number: 4,475,894

[45] Date of Patent: Oct. 9, 1984

[54] FRONT SPROCKET WHEEL HAVING CHAIN GUARD FOR BICYCLES

[75] Inventor: Yasushi Sugino, Nara, Japan

[73] Assignee: Sugino Cycle Industries, Ltd., Osaka, Japan

[21] Appl. No.: 375,825

[22] Filed: May 7, 1982

[30] Foreign Application Priority Data

May 27, 1981 [JP] Japan ............................ 56-78255[U]

[51] Int. Cl.³ .............................................. B62J 13/00
[52] U.S. Cl. ..................................... 474/144; 474/160
[58] Field of Search ............... 474/144, 151, 158, 160, 474/161; 74/608, 609

[56] References Cited

U.S. PATENT DOCUMENTS

| 3,477,303 | 11/1969 | Brilando | 474/144 |
| 3,550,465 | 12/1970 | Maeda | 474/151 |
| 3,610,066 | 10/1971 | Rychlik | 474/161 X |
| 3,815,439 | 6/1974 | Tarutani | 474/144 |
| 3,835,729 | 9/1974 | Tarvtani | 474/144 |
| 4,009,621 | 3/1977 | Segawa | 474/160 |
| 4,044,621 | 8/1977 | McGregor, Sr. et al. | 474/144 |
| 4,106,357 | 8/1978 | Segawa | 474/160 |

FOREIGN PATENT DOCUMENTS 5099 of 1897 United Kingdom ................ 474/161

Primary Examiner—Lawrence J. Staab
Assistant Examiner—Dwight G. Diehl
Attorney, Agent, or Firm—Koda and Androlia

[57] ABSTRACT

A front sprocket wheel for bicycles which comprises an annular member in the form of an integral molding made of plastics or the like and including a chain guard, an outer gear and support arms, and a plate member made of an integral metal plate and including a boss portion, an inner gear positioned around the boss portion and connecting arms interconnecting the boss portion and the inner gear. The support arms of the annular member are fixed to the connecting arms of the plate member.

4 Claims, 4 Drawing Figures

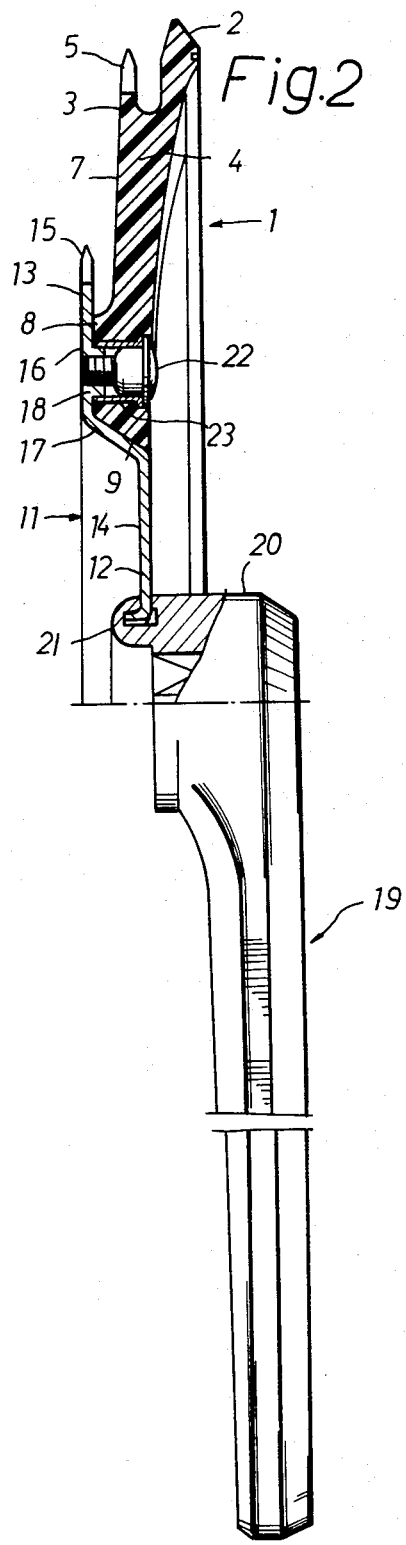
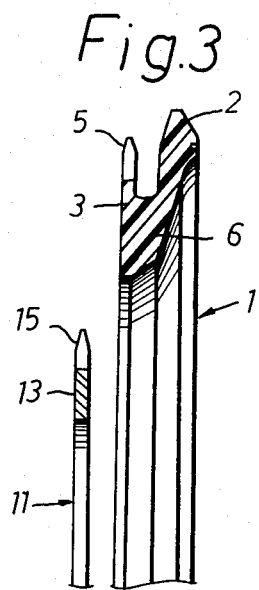
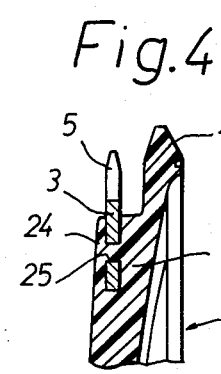

FRONT SPROCKET WHEEL HAVING CHAIN GUARD FOR BICYCLES

BACKGROUND OF THE INVENTION

The present invention relates to a front sprocket wheel having a chain guard for use in bicycles for driving the rear wheel of the bicycle through a chain.

Front sprocket wheels having a chain guard are known for use in bicyles wherein an inner gear, an outer gear diametrically larger than the inner gear and the chain guard larger than the outer gear are arranged concentrically with the pedal crankshaft of the bicycle and spaced apart from one another axially of the crankshaft. The inner gear, the outer gear and the chain guard, each of which is an independent annular member, are fixed to the crankshaft by a boss member having radial arms. The boss of the boss member is secured to the crankshaft, while the gears and the chain guard are spaced apart by predetermined distances and attached to the radial arms with use of collars.

Accordingly the conventional front sprocket wheel is cumbersome to assemble, costly and moreover heavy in its entirety.

SUMMARY OF THE INVENTION

An object of the present invention is to provide a front sprocket wheel for bicycles which has a chain guard and which comprises a pedal crank, an annular member including the chain guard and an outer gear integral therewith, and a plate member including an inner gear, the annular member being integrally formed with support arms centripetally extending therefrom and arranged at a spacing circumferentially thereof, the plate member being in the form of an integral plate including a boss portion fixed to the shaft of the crank, the inner gear as positioned around the boss portion and connecting arms connecting the boss portion to the inner gear and positioned in corresponding relation to the support arms, the support arms of the annular member being fixed to the connecting arms of the plate member. Accordingly the sprocket wheel, except for the crank, is composed of only two parts, namely the annular member and the plate member, and can be assembled easily by fixing the support arms to the connecting arms. The annular member can be made from plastics or an aluminum-containing light alloy by injection molding or die casting. In this case, the annular member is easy to make and lightweight.

Another object of the invention is to provide a front sprocket wheel of the type described wherein the annular member is an integral molding and has on one side of each support arm a chain reeving guide surface continuous and flush with the corresponding surface of the outer gear, the support arm being integrally formed at its inner end with a base portion projecting from the guide surface, each of the connecting arms of the plate member being fitted over and fixed to the base portion. Accordingly, when the chain is to be transferred from the outer gear to the inner gear for a speed reduction, the chain is smoothly brought into engagement with the inner gear by being guided by the guide surface.

Another object of the invention is to provide a front sprocket wheel of the type described wherein each of the support arms has an inner end face serving as an engaging surface, and each of the connecting arms of the plate member has a mount portion fitted over and fixed to the base portion of the support arm and a support portion extending obliquely or at an angle from the mount portion and in engagement with the engaging surface. Accordingly even when the support arms of the molded annular member are not sufficiently strong, the support arms for reinforced by the plate member of metal. Preferably the base portion of the support arm has a bore extending therethrough, and each of the connecting arms of the plate member has a mount boss fitted in the bore and internally threaded. The support arm is fixed in the connecting arm by a screw screwed in the mount boss fitted in the bore.

Other objects of the present invention will become apparent from the following description.

BRIEF DESCRIPTION OF THE DRAWINGS

FIG. 2 is an enlarged partial sectional view of FIG. 1 showing the upper half of an annular member as well as of a plate member;

FIG. 3 is an enlarged view in section taken along the line III—III in FIG. 1; and FIG. 4 is a fragmentary sectional view on an enlarged scale showing another annular member embodying the invention.

DESCRIPTION OF THE PREFERRED EMBODIMENTS

Figure 1:
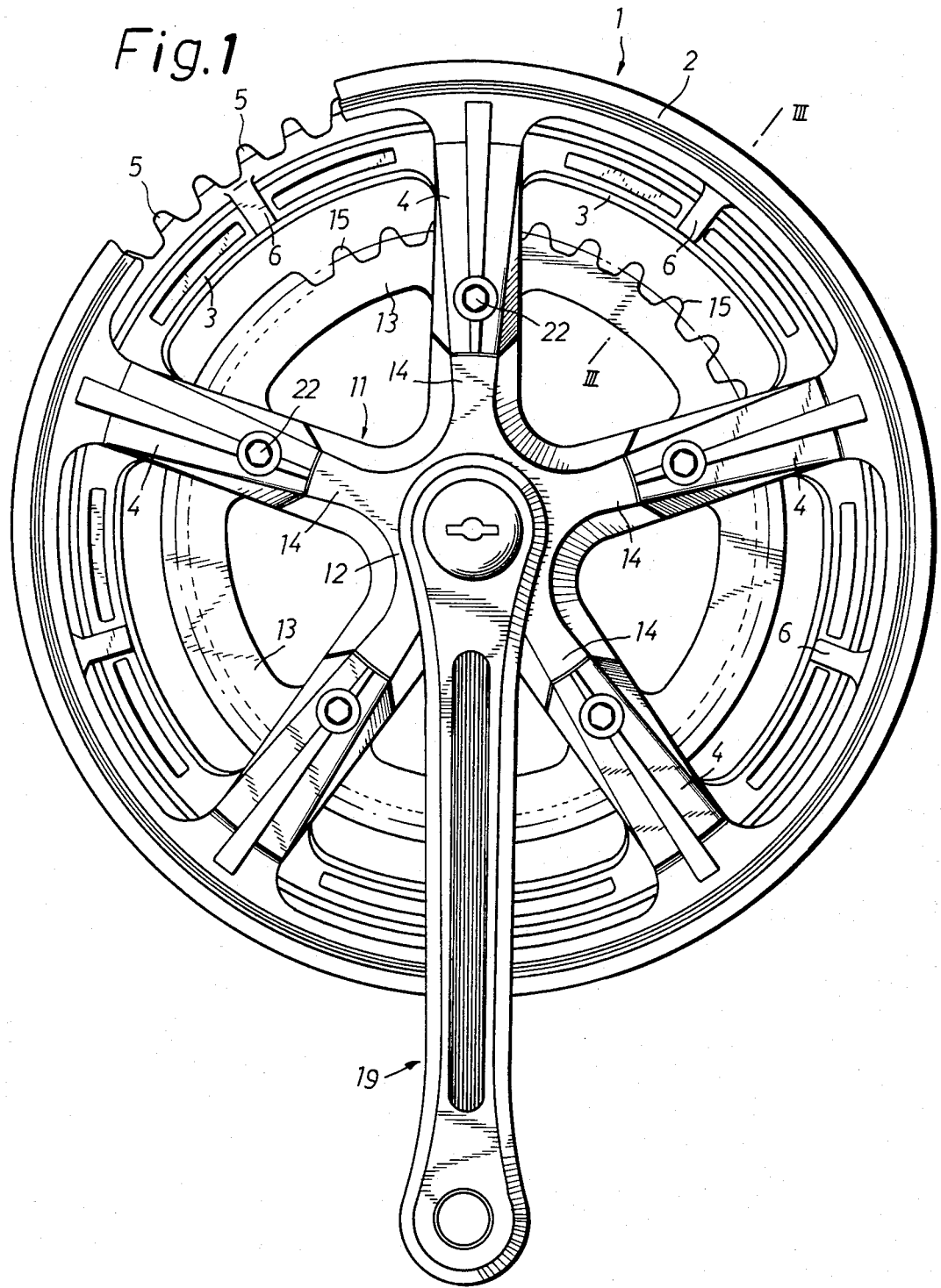
FIG. 1 is a front view partly broken away and showing an embodiment of the invention.

FIGS. 1 and 2 show a front sprocket wheel for bicycles which comprises an annular member 1, a plate member 11 and a pedal crank 19.

The annular member 1 is integrally made from plastics by injection molding or from a light alloy by die casting and has a chain guard 2, an outer gear 3 and support arms 4 which are made integrally. When a plastics material is used, it is preferable to use nylon resin. The chain guard 2 is annular and is diametrically larger than the outer gear 3. The outer gear 3 is in the form of a ring formed with sprockets 5 on its outer periphery and is disposed on one side of the chain guard 2 at a distance therefrom. The gear 3 is connected to the guard 2 by support arms 4. As seen in FIG. 3, the gear 3 and the guard 2 are further interconnected by connectors 6 arranged between the support arms 4. Alternatively a connector 6 may extend continuously over the entire circumference of the annular member 1. The support arms 4, which are five in number in the illustrated embodiment, extend centripetally of the annular member 1 and are arranged at a spacing circumferentially thereof. Each of the support arms 4 has on one side thereof a chain reeving guide surface 7 which is continuous and flush with the corresponding side of the outer gear 3. The support arm 4 is integrally formed at its inner end with a base portion 8 projecting from the guide surface 7. The inner end face of the arm serves as an engaging surface 9. The guide surface 7 is slightly inclined toward the base portion 8. The support arm 4 has a bore 10 extending through the base portion 8. The engaging surface 9 is inclined toward the base portion 8.

The plate member 11 is in the form of an integral metal plate including a boss portion 12, an inner gear 13 positioned around the boss portion 12 and radial connecting arms 14 interconnecting the boss portion 12 and the inner gear 13. The boss portion 12 is attached to the crankshaft to be described later and has serrations on its inner peripheral edge. The inner gear 13 is generally in the form of a ring having a smaller diameter than the outer gear 3 but positioned radially slightly outwardly of the base portions 8 of the support arms 4. The gear 13 has sprockets 15 along its outer periphery. The radial connecting arms 14 are arranged in corresponding relation to the support arms 4 and each have a mount portion 16 fitted over and fixed to the base portion 8 of the support arm 4 and a support portion 17 extending from the mount portion 16 obliquely or at an angle in a bent form and in engagement with the engaging surface 9. The mount portion 16 is provided with a mount boss 18 fitting in the bore 10 of the base portion 8. The boss 18 is internally threaded.

The pedel crank 19 is similar to those already known and has an end 21 projecting in the form of a cylinder from its shaft 20. The shaft end 21 is formed with serrations on its outer periphery.

The annular member 1, the plate member 11 and the crank 19 are assembled as seen in FIGS. 1 and 2 to provide a front sprocket wheel having the chain guard 2 for use in bicycles. To assemble the sprocket wheel, the mount boss 18 of each connecting arm 14 of the plate member 11 is fitted in the bore 10 in each support arm 4 of the annular member 1, with the mount portion 16 of the arm 14 fitted over the base portion 8 and with the support portion 17 in engagement with the engaging surface 9. In this state, a screw 22 is screwed in the mount boss 18 through the bore 10. Preferably bush 23 is provided around the mount boss 18 as shown in FIG. 2. The bush 23 can be placed in the bore 10 when the annular member 1 is molded. Preferably the screw 22 has a hexagonal socket head. The front sprocket thus constructed is finally attached to the crank 19. The shaft end 21 of the crank 19 is inserted through the boss portion 12 of the plate member 11 with their serrations in engagement, and the extremity of the shaft end 21 is crimped as seen in FIG. 2, whereby the boss portion 12 is secured to the shaft end 21. The inner gear 13, the outer gear 3 and the chain guard 2 are now arranged concentrically with the crankshaft 20 and spaced apart axially thereof by predetermined distances.

FIG. 4 shows another annular member 1 embodying the invention. The annular member 1 is the form of a molding including a chain guard 2 and support arms 4 integral therewith. An outer gear 3 is made from a metal plate in the form of a ring and has sprockets 5 along its outer periphery. Each of the support arms 4 has a mount portion 24 projecting on one side of the chain guard 2. The outer gear 3 has a base portion fixedly embedded in the mount portion 24. Preferably the base portion of the outer gear 3 is formed with a hole 25, and such gear base portions are inserted into the mold for forming the annular member 1 so that the base portions can be embedded in the mount portions 24 upon molding.

The present invention can be embodied variously based on the spirit of the invention, and the foregoing embodiments which are given for illustrative purposes only are in no way limitative. For example, a middle gear diametrically intermediate between the outer gear and the inner gear can be formed on the annular member integrally with the support arms. In this case, the base portion of the support arm for attaching the inner gear is made to project a larger amount than in illustrated, and the plate member is attached to the base portion. The front sprocket wheel then obtained has three gears, i.e. two gears on the annular member and one gear (inner) on the plate member, for use in bicycles.

What is claimed is:

1. A front sprocket wheel for a bicycle wherein an inner gear, an outer gear diametrically larger than the inner gear and a chain guard diametrically larger than the outer gear are arranged concentrically with a pedal crankshaft and spaced apart from one another axially of the crankshaft, the sprocket wheel comprising an annular member including the chain guard and the outer gear integral therewith, and a plate member having the inner gear; the annular member being formed integrally with connectors interconnecting the chain guard and the outer gear and with support arms centripetally extending from the connectors and arranged at a spacing circumferentially of the annular member, each of the support arms having on one side thereof a chain receiving guide surface continuous and flush with the corresponding surface of the outer gear and being integrally formed at its inner end with a base portion projecting from the guide surface, an inner end face of the each support arm serving as an engaging surface inclined toward the base portion; the plate member being in the form of an integral plate including a boss portion fixed to the crankshaft with a shaft end crimped and secured thereto, the inner gear as positioned around the boss portion and connecting arms interconnecting the boss portion and the inner gear and positioned in corresponding relation to the support arms, each of the connecting arms having a mount portion fitted over and fixed to the base portion of the support arm and a support portion extending obliquely from the mount portion and in engagement with the engaging surface, extending portions extended from the support portions to the boss portions of the connecting arms being positioned substantially on the same plane as defined by the connectors.

2. A front sprocket wheel as defined in claim 1 wherein the annular member is a molding, and the chain guard, the outer gear and the support arms are formed integrally.

3. A front sprocket wheel as defined in claim 1 wherein the annular member is a molding including the support arms integral with the chain guard and a mount portion integral with each of the support arms on one side thereof, and the outer gear is made of a metal plate and has a base portion embedded in the mount portion.

4. A front sprocket wheel for a bicycle wherein an inner gear, an outer gear diametrically larger than the inner gear and a chain guard diametrically larger than the outer gear are arranged concentrically with a pedal crankshaft and spaced apart from one another axially of the crankshaft, the sprocket wheel comprising an annular member including the chain guard and the outer gear integral therewith, and a plate member having the inner gear; the annular member being formed integrally with connectors interconnecting the chain guard and the outer gear and with support arms centripetally extending from the connectors and arranged at a spacing circumferentially of the annular member, each of the support arms having on one side thereof a chain receiving guide surface continuous and flush with the corresponding surface of the outer gear and being integrally formed at its inner end with a base portion projecting from the guide surface so as to form a thickened portion at the inner end, the base portion having a bore extending therethrough, an inner end face of the each support arm serving as an engaging surface inclined toward the base portion; the plate member being in the form of an integral plate including a boss portion fixed to the crankshaft with a shaft end crimped and secured thereto, the inner gear as positioned around the boss portion and connecting arms interconnecting the boss portion and the inner gear and positioned in corresponding relation to the support arms, each of the connecting arms having a mount portion fitted over and fixed to the base portion of the support arm and a support portion extending obliquely from the mount portion and in engagement with the engaging surface, the mount portion having a mount boss fitted in the bore and internally threaded, the mount portion being fixed to the base portion with a screw inserted in the bore and screwed in the mount boss, extending portions extending from the support portions to the boss portions of the connecting arms being positioned substantially on the same plane as defined by the connectors.

* * * * *